United States Patent
Murata et al.

(10) Patent No.: US 8,250,680 B2
(45) Date of Patent: Aug. 28, 2012

(54) URINAL

(75) Inventors: Kensuke Murata, Fukuoka (JP); Masayuki Nagaishi, Fukuoka (JP); Tomoyuki Abe, Fukuoka (JP); Hiroshi Tsuboi, Fukuoka (JP)

(73) Assignee: Toto Ltd., Fukuoka (JP)

( * ) Notice: Subject to any disclaimer, the term of this patent is extended or adjusted under 35 U.S.C. 154(b) by 1064 days.

(21) Appl. No.: 12/172,176

(22) Filed: Jul. 11, 2008

(65) Prior Publication Data

US 2009/0070922 A1 Mar. 19, 2009

(30) Foreign Application Priority Data

Jul. 13, 2007 (JP) ................. P.2007-184566

(51) Int. Cl.
*E03D 13/00* (2006.01)

(52) U.S. Cl. ............................. 4/304; 251/129.04

(58) Field of Classification Search ...... 4/302, 304–306; 250/216, 221; 251/129.04, 129.06
See application file for complete search history.

(56) References Cited

U.S. PATENT DOCUMENTS

| 6,212,697 B1 * | 4/2001 | Parsons et al. ............... 4/302 |
| 6,619,614 B2 * | 9/2003 | Parsons et al. ............... 251/129.04 |
| 7,031,719 B2 * | 4/2006 | Miyano et al. ................ 455/452.1 |
| 7,156,363 B2 * | 1/2007 | Parsons et al. ............... 251/30.04 |

FOREIGN PATENT DOCUMENTS

| JP | 2002-285626 A | 10/2002 |
| JP | 2005-274406 A | 10/2005 |
| JP | 2005-290718 A | 10/2005 |
| JP | 2005-325589 A | 11/2005 |
| JP | 3740696 B2 | 11/2005 |
| JP | 2005-274406 A | 10/2006 |
| JP | 2006-287766 A | 10/2006 |

OTHER PUBLICATIONS

International Search Report dated Aug. 26, 2008.

* cited by examiner

*Primary Examiner* — Korie H. Chan
(74) *Attorney, Agent, or Firm* — Kimble Intellectual Property Law, PLLC

(57) ABSTRACT

A urinal includes: a urinal body; a high-frequency sensor which radiates a radio beam obliquely passing through an upper surface of the urinal body toward a bowl and receives a reflected wave from an object so as to generate a detection signal; and a valve which discharges or stops flushing water to the urinal body in response to the detection signal. An angle formed between a first plane including the upper surface of the urinal body and a second plane including a radiation surface of an antenna of the high-frequency sensor is in a range of more than 0 degree to less than 90 degree. A cross line where the first plane and the second plane intersect with each other is substantially parallel to a horizontal direction of the urinal body. The radio beam is a linearly-polarized wave. An excitation direction of the radio beam intersects with the cross line. An intensity of the radio beam passing through the urinal body is larger than that of the radio beam reflected by the upper surface.

8 Claims, 14 Drawing Sheets
(7 of 14 Drawing Sheet(s) Filed in Color)

EXCITATION
DIRECTION

EXCITATION
DIRECTION

EXCITATION DIRECTION

EXCITATION DIRECTION

EXCITATION DIRECTION

EXCITATION DIRECTION

β = 80°

β = 55°

β = 75°

β = 50°

β = 60°

β = 45°

URINAL

This application claims priority from Japanese Patent Application No. 2007-184566, filed on Jul. 13, 2007. The entire contents of each of the applications are incorporated by reference herein.

BACKGROUND OF THE INVENTION

1. Technical Field

The present invention relates to a urinal, and more particularly, to a urinal having a high-frequency sensor.

2. Related Art

When a human body and a liquid flow are detected with high precision using a Doppler frequency signal from a high-frequency sensor to control an opening and closing of a valve at an appropriate timing, a urinal can be used without wasting cleaning water. Also, when an antenna of the high-frequency sensor is configured by patch electrodes, it is possible to facilitate a decrease in size of the high-frequency sensor.

In the related art, there has been known a urinal cleaning device which controls an opening and closing of a valve provided in a water supply pipe (see e.g., Japanese Patent No. 3740696). In the related art, a liquid flow state in a bowl interior space is calculated based on a Doppler frequency corresponding to a difference between a transmitted wave and a received wave, thereby controlling the valve.

In the urinal, in order to detect a human body or a flow of urine with a low emission power while restraining an erroneous detection, it is necessary to control a direction of a radio beam with high precision. However, there is a limitation upon changing a direction of a radio beam just by controlling an arrangement or a phase of the patch electrodes. When an intersection angle between a radiation surface of the patch antenna and a urinal body is adjusted, it is possible to easily change a direction of the radio beam. In this case, a transmissivity of a dielectric medium decreases due to an excitation direction, and thus a problem arises in that the radio beam cannot be transmitted to an object with a high transmissivity.

Also, JP-A-2005-290718 discloses a urinal in which a radio frequency sensor is placed on a rear upper surface of a urinal body and the radio frequency sensor is configured to radiate a radio beam obliquely. However, according to the configuration of the related art, the radio beam radiated from the radio frequency sensor is reflected at the boundary between the urinal body and an air. Accordingly, in order to detect a human body or a flow of urine, it is necessary to provide a reflector, which is used for reflecting the radio beam reflected at the boundary between the urinal and the air again, over the radio frequency sensor. Thus, since the reflector must be newly provided in the urinal, there is a problem in that design of the urinal is limited.

SUMMARY OF THE INVENTION

According to the present invention, it is an object to provide a urinal including a high-frequency sensor capable of radiating the radio beam to the object with high precision, and by which transmissivity in a dielectric material can be enhanced.

According to an exemplary embodiment of the present invention, there is provided a urinal. A urinal includes: a urinal body; a high-frequency sensor which radiates a radio beam obliquely passing through an upper surface of the urinal body toward a bowl and receives a reflected wave from an object so as to generate a detection signal; and a valve which discharges or stops flushing water to the urinal body in response to the detection signal. An angle formed between a first plane including the upper surface of the urinal body and a second plane including a radiation surface of an antenna of the high-frequency sensor is in a range of more than 0 degree to less than 90 degree. A cross line where the first plane and the second plane intersect with each other is substantially parallel to a horizontal direction of the urinal body. The radio beam is a linearly-polarized wave. An excitation direction of the radio beam intersects with the cross line, and an intensity of the radio beam passing through the urinal body is larger than that of the radio beam reflected by the upper surface.

According to another exemplary embodiment of the present invention, there is provided a urinal. A urinal includes: a urinal body; a high-frequency sensor which radiates a radio beam obliquely passing through a rear surface of the urinal body toward a bowl and receives a reflected wave from an object so as to generate a detection signal; and a valve which discharges or stops flushing water to the urinal body in response to the detection signal. An angle formed between a first plane including the rear surface of the urinal body and a second plane including a radiation surface of an antenna of the high-frequency sensor is in a range of more than 0 degree to less than 90 degree. A cross line where the first plane and the second plane intersect with each other is substantially parallel to a horizontal direction of the urinal body. The radio beam is a linearly-polarized wave. An excitation direction of the radio beam intersects with the cross line, and an intensity of the radio beam passing through the urinal body is larger than that of the radio beam reflected by the rear surface.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF EXEMPLARY EMBODIMENTS

Hereinafter, exemplary embodiments of the present invention will be described with reference to the accompanying drawings.

Figure 1:
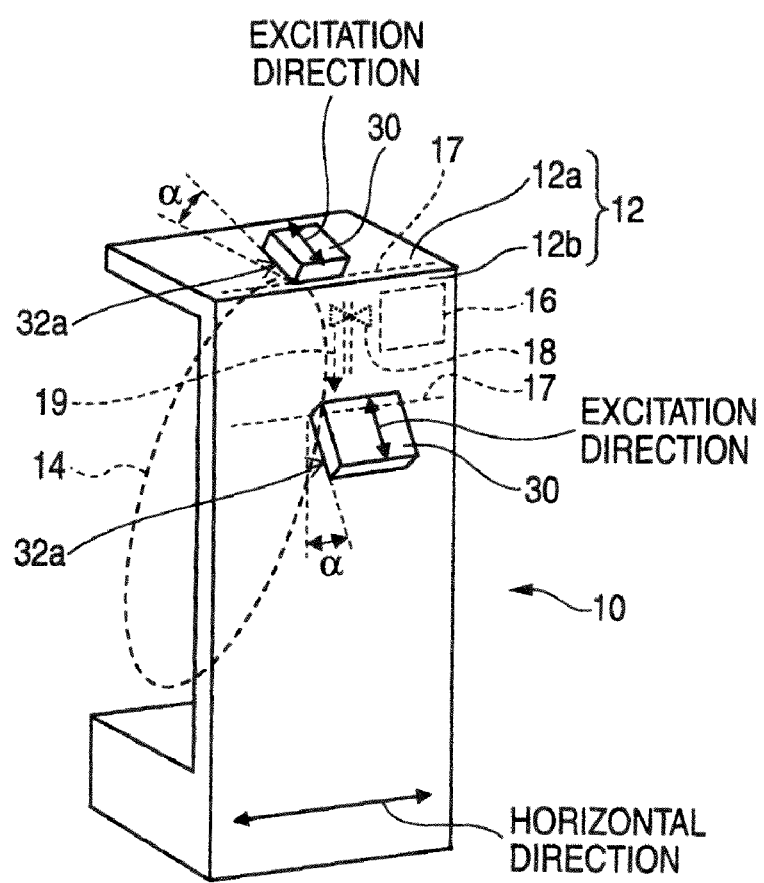
FIG. 1 is a view illustrating a configuration of a urinal.

FIG. 1 is a view illustrating a configuration of a urinal according to an embodiment of the present invention. A urinal body 12 is made of, e.g., earthenware (relative permittivity: $\in_r$), and has an upper surface 12a and a rear surface 12b. A high-frequency sensor 30 is disposed on the upper surface 12a or the rear surface 12b, and radiates a radio beam 14. A radiation pattern of the high-frequency sensor 30 is controlled, and the high-frequency sensor 30 inputs a Doppler frequency signal corresponding to a difference frequency between a transmitted frequency and a reflected frequency reflected from an object, to a control part 16. The control part 16 outputs an ON/OFF signal, and controls an opening and closing of a valve 18 so as to discharge or stop flushing water 19.

The high-frequency sensor 30 is relatively fixed to the urinal body 12, and radiates the radio beam 14 passing through the urinal body 12 to a bowl. In this case, when the upper surface 12a is substantially parallel to a radiation surface of an antenna, the radio beam 14 is radiated in a direction substantially perpendicular to the radiation surface 32a of the antenna, and the radio beam 14 substantially faces the downside in a vertical direction. In this case, a shake of seal water filled in the bowl of the urinal body 12 may be erroneously detected as the frequency of the Doppler signal from a human body.

Meanwhile, when the radiation surface of the antenna is substantially parallel to the rear surface 12b, the radio beam 14 faces a horizontal direction. In this case, a disturbance such as a human body passing by the urinal body 12 or a noise of a fluorescent lamp may be easily detected.

In this embodiment, a plane including the incident surface of the urinal body 12 to which the radio wave radiated from the antenna is incident and a plane including the radiation surface of the antennal intersect with each other in an cross line in an angular range of 0 to 90 degree. Then, an excitation direction of the radio beam is set to be substantially perpendicular to the cross line.

Specifically, an angle α formed between the upper surface 12a of the urinal body 12 and the radiation surface 32a of the antenna or an angle α formed between the rear surface 12b and the radiation surface 32a is set in a range of more than 0 degree to less than 90 degree. An cross line 17 formed between the upper surface 12a and the radiation surface 32a or the cross line 17 formed between the rear surface 12b and the radiation surface 32a is set to be substantially parallel to a horizontal direction of the urinal body 12, which is indicated by the arrow. That is, the angle α is maintained so that a gap formed between the radiation surface 32a and the upper surface 12a or a gap formed between the radiation surface 32a and the rear surface 12b is substantially identical with the horizontal direction of the urinal body 12. With such a configuration, it is possible to reduce an influence of the disturbance and the erroneous detection. In addition, the radio beam 14 is easily allowed to face a direction substantially perpendicular to the horizontal direction of the urinal body 12, and thus it is possible to restrict interference between a plurality of urinals arranged in rows, thereby improving a detection precision upon detecting the object.

Figure 2A:
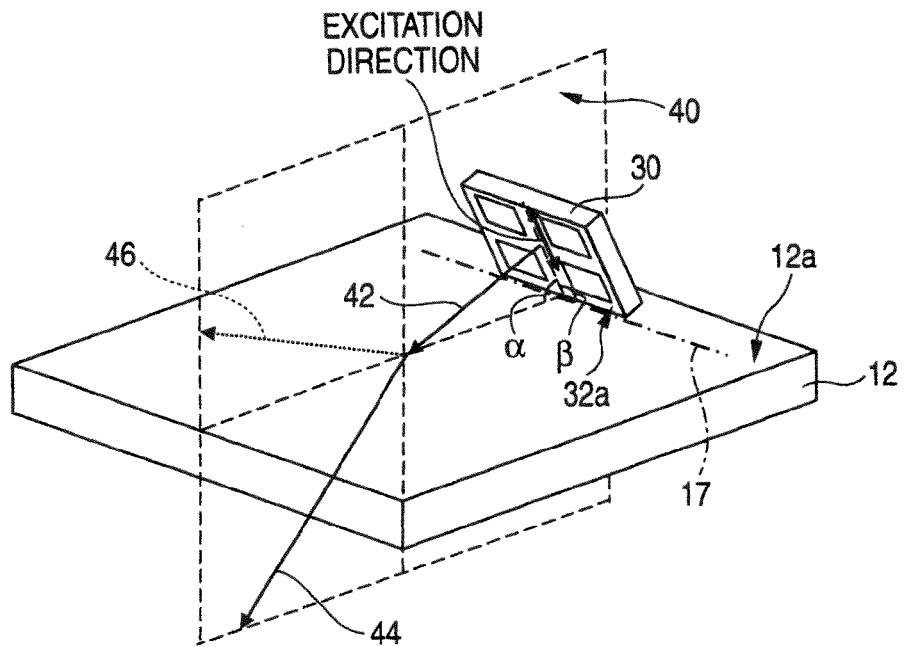
FIGS. 2A to 2C are views illustrating an arrangement of a high-frequency sensor in a case where an excitation direction is substantially parallel to an incident surface.
Figure 2B:
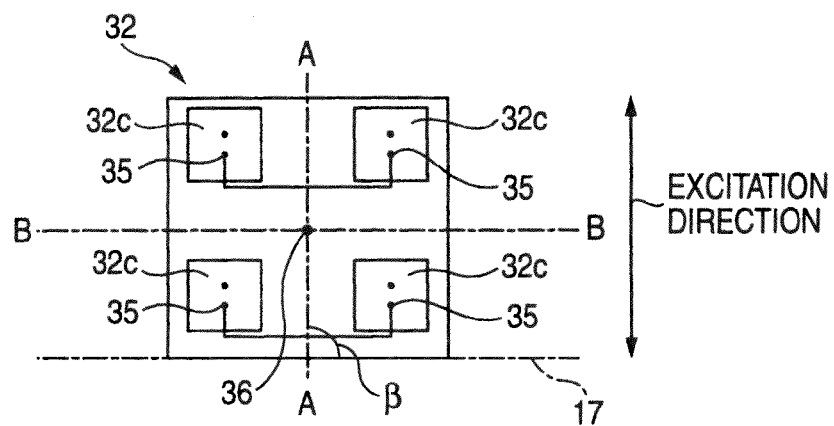
Figure 2C:
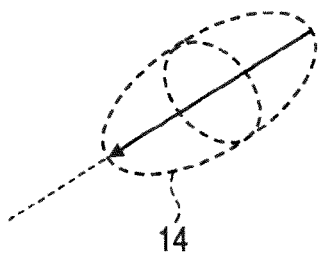

FIGS. 2A to 2C are views illustrating an arrangement of the high-frequency sensor 30 of the urinal 10 according to this embodiment, where FIG. 2A is a schematic perspective view, FIG. 2B is a schematic top view showing the patch antenna, and FIG. 2C is a view showing the radio beam.

The high-frequency sensor 30 is disposed on the upper surface 12a of the ceramic ware or the like. The high-frequency sensor 30 is disposed such that an intersection angle formed between the upper surface 12a and the radiation surface 32a of the patch antenna 32 is set to the angle α. The radio beam 14 radiated from the patch antenna 32 generates a transmitted beam and a reflected beam at the upper surface 12a. In addition, the same applies to the rear surface 12b as well as the upper surface 12a.

As shown in FIG. 2B, four feed elements 32c are arranged on both sides of the line A-A and the line B-B. A center point 36 corresponding to an intersection point where the line A-A intersects with the line B-B is almost a center point of the patch antenna 32 and a radiation center of the radio beam 14. Each feeding point 35 is connected to an oscillator so that the radio beam 14 is excited. The excitation direction of the radio beam 14 is located at the radiation surface 32a so as to be parallel to the line A-A indicated by the arrow. By using such a patch antenna 32, it is possible to easily generate an excitation of a linearly-polarized wave.

As shown in FIG. 2C, the radiation pattern of the radio beam 14 spreading in space can be controlled by changing an arrangement of the four feed elements 32c. In FIG. 2A, a surface perpendicular to the radiation surface 32a and perpendicular to the upper surface 12a via the center point 36 is referred to as an incident surface 40. The radio beam 14 radiated from the vicinity of the center point 36 generates a transmitted beam passing through the upper surface 12a as a transmission surface so as to be transmitted to a medium such as earthenware constituting the urinal body 12 and a reflected beam reflected by the upper surface 12a as a reflection surface.

In addition, in the embodiment shown in FIG. 2B, the radiation pattern of the radio beam 14 is controlled by the four feed elements 32c. However, the configuration of the patch antenna 32 is not limited thereto.

Figure 3A:
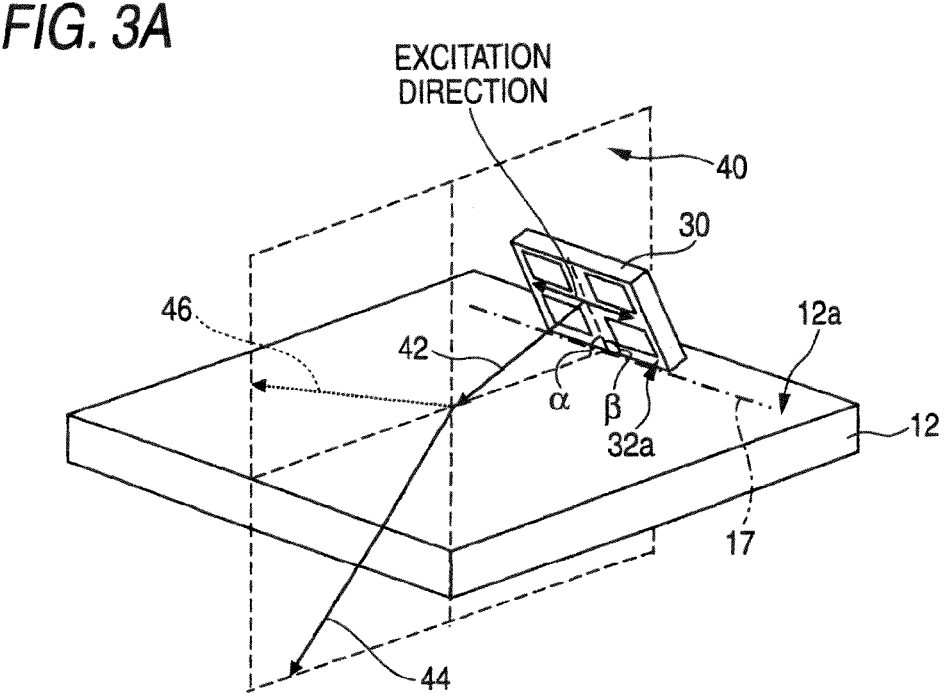
FIGS. 3A to 3C are views illustrating the arrangement of the high-frequency sensor in a case where the excitation direction is substantially perpendicular to the incident surface.
Figure 3B:
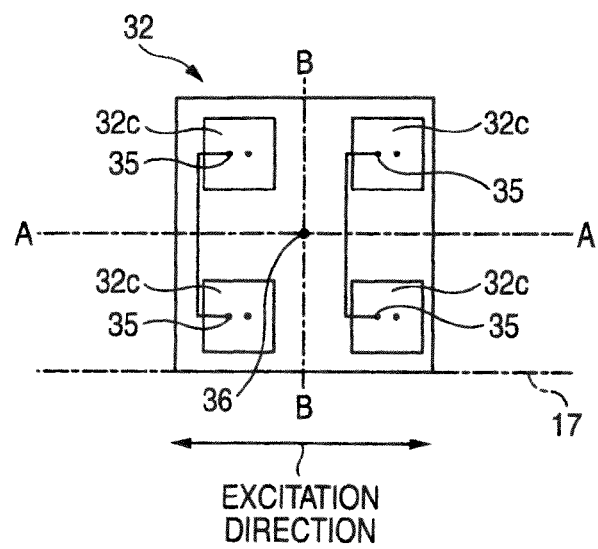
Figure 3C:
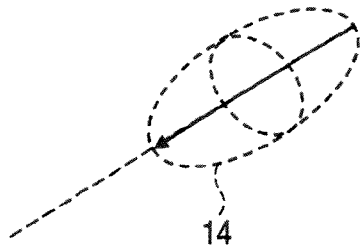
Figure 4A:
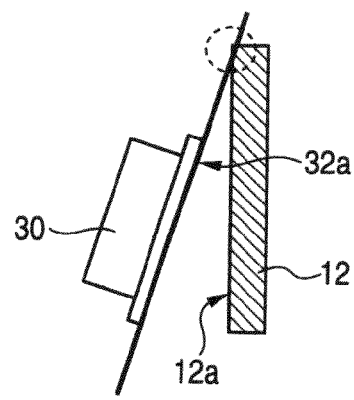
FIGS. 4A and 4B are schematic sectional view illustrating a case where a radiation surface does not directly contact with a surface.
Figure 4B:
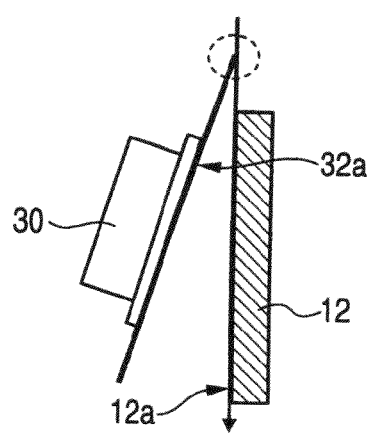

Next, a case will be described in which the radio beam 14 changes depending on the intersection angle α formed between the radiation surface 32a and the upper surface 12a or the rear surface 12b when the urinal body 12 is made of earthenware having $\in_r$=4.15 in terms of a simulation. FIGS. 3A to 3C show an arrangement of the high-frequency sensor in a case where the excitation direction is substantially perpendicular to the incident surface 40, where FIG. 3A is a schematic perspective view and FIG. 3B is a schematic top view showing a patch antenna. In addition, a simulation frequency is 10.525 GHz. In the following simulation, an intersection angle β formed between the excitation direction and the cross line 17 in which a plane including the radiation surface 32a intersects with the upper surface 12a or the rear surface 12b of the urinal body 12 substantially forms a right angle. In addition, the radiation surface 32a may not directly contact with the upper surface 12a or the rear surface 12b. FIG. 4A shows a case where a plane including the radiation surface 32a intersects with the upper surface 12a or a plane including the radiation surface 32a intersects with the rear surface 12b. FIG. 4B shows a case where a plane including the radiation surface 32a intersects with a plane including the upper surface 12a or a plane including the radiation surface 32a intersects with a plane including the rear surface 12b.

Even when the angle β is not at 90 degree, the simulation result may be applied to components perpendicular to the cross line 17. The radio beam 14 in the incident surface 40 includes an incident beam 42, a transmitted beam 44, and a reflected beam 46. That is, the incident beam 42 is divided into a component forming the transmitted beam 44 refracted by a difference in relative permittivity between air and the urinal body 12 and a component forming the reflected beam 46 reflected at the upper surface 12a or the rear surface 12b.

Figure 5A:
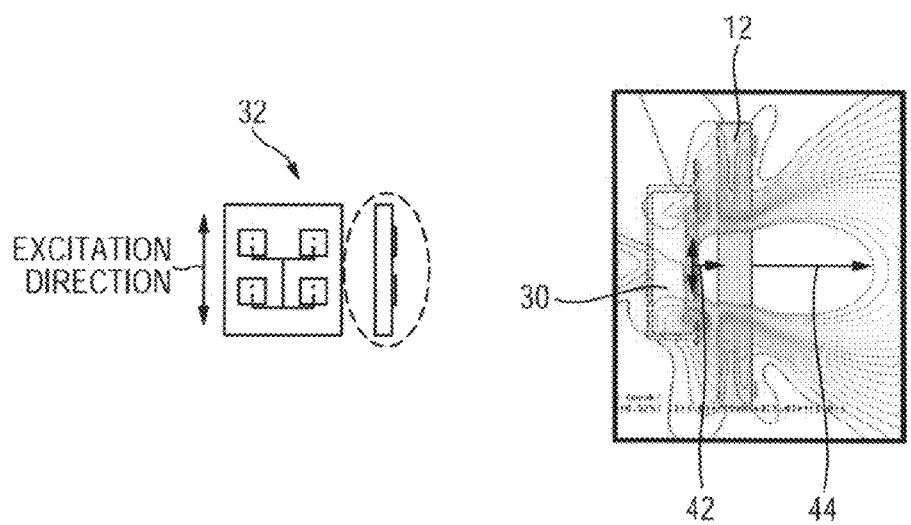
FIGS. 5A and 5B are sectional views illustrating an emission pattern in a simulation case of an angle □=0 degree.
Figure 5B:
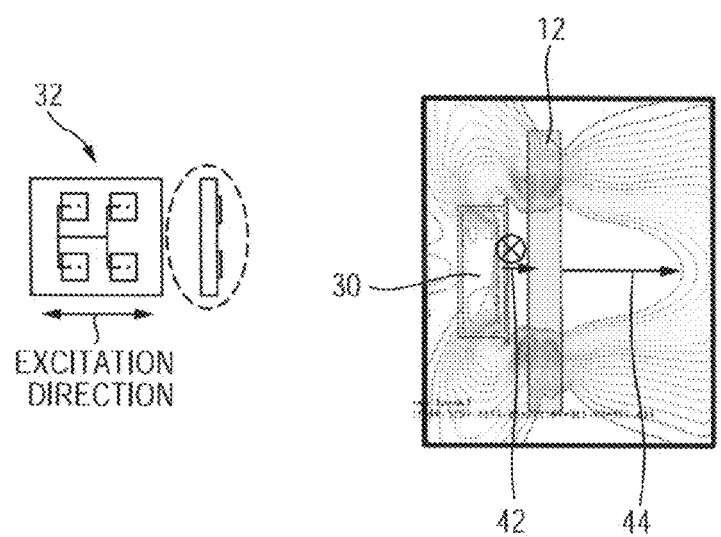

FIGS. 5A and 5B are sectional views showing the radiation pattern in the incident surface 40 in terms of a simulation in a case of angle α=0 degree, that is, the radiation surface 32a is parallel to the upper surface 12a or the rear surface 12b without being inclined, where FIG. 5A shows a case where the excitation direction is substantially parallel to the incident surface 40 and FIG. 5B shows a case where the excitation direction is substantially perpendicular to the incident surface 40. Curved lines shown in FIGS. 5A and 5B are obtained by connecting the points having the same radiation intensity of the radio beam 14, and the outermost curved line has the lowest radiation intensity. In any case, the radio beam 14 easily passes through the urinal body 12, and a large difference does not occur in the transmission power. However, it may not be supposed that the object exists at this position. In this case, when the radiation surface 32a is inclined with respect to the upper surface 12a or the rear surface 12b, it is possible to efficiently radiate the radio beam 14 to the object.

Figure 6A:
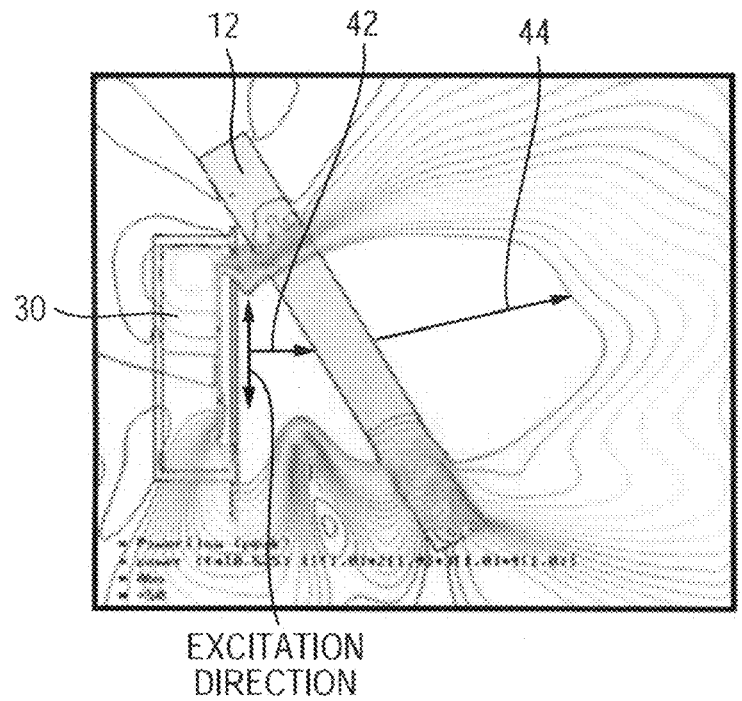
FIGS. 6A and 6B are sectional views illustrating an emission pattern in the incident surface in the simulation.
Figure 6B:
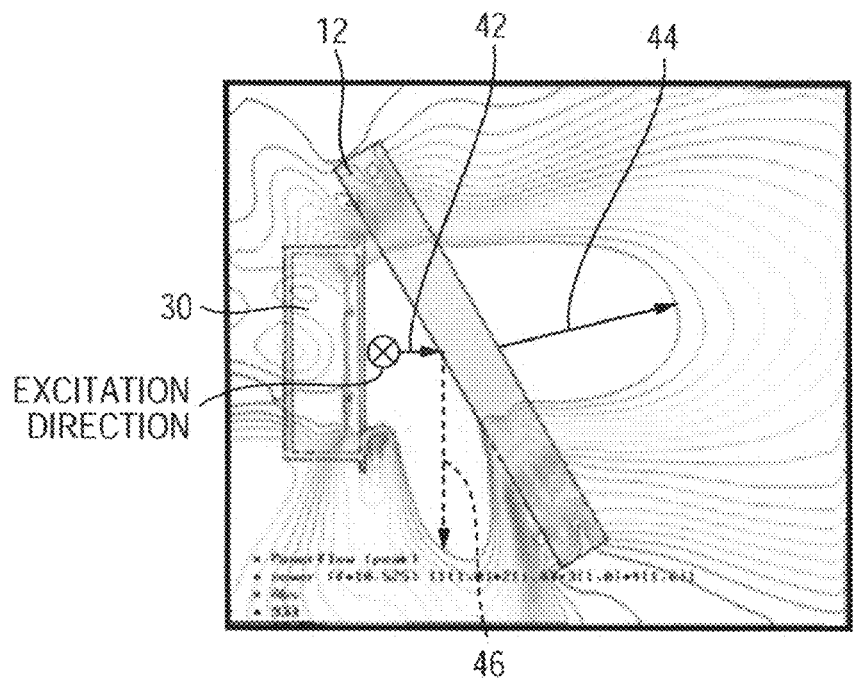

FIGS. 6A and 6B are sectional views showing the radiation pattern in the incident surface 40 in terms of a simulation in a case of the angle α=30 degree, where FIG. 6A shows a case where the excitation direction is substantially parallel to the incident surface 40 and FIG. 6B shows a case where the excitation direction is substantially perpendicular to the incident surface 40. A transmissivity of FIG. 6A is larger than that of FIG. 6B. FIG. 6B shows a case where a reflectivity of the urinal body 12 is large.

Figure 7A:
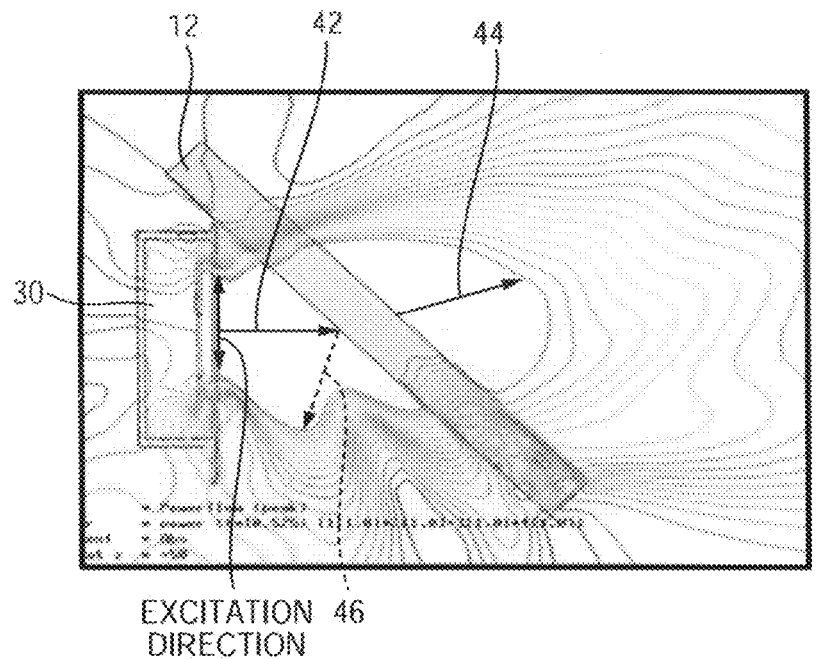
FIGS. 7A and 7B are sectional views illustrating the emission pattern in the incident surface in the simulation.
Figure 7B:
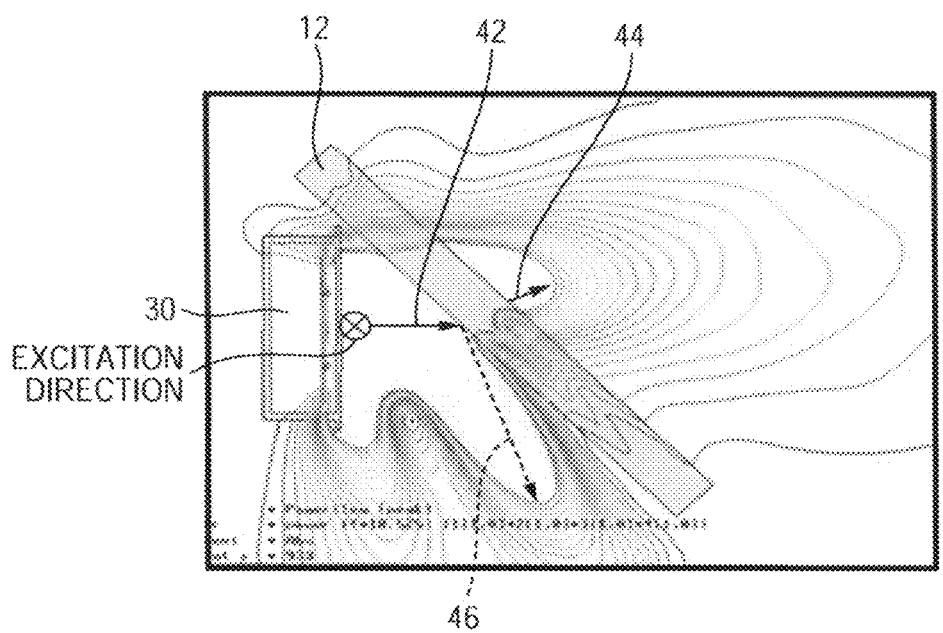

FIGS. 7A and 7B are sectional views showing the radiation pattern in the incident surface 40 in terms of a simulation in a case of the angle α=45 degree, where FIG. 7A shows a case where the excitation direction is substantially parallel to the incident surface 40 and FIG. 7B shows a case where the excitation direction is substantially perpendicular to the incident surface 40. Each transmissivity becomes smaller than that in a case where the angle α=30 degree. Particularly, in FIG. 7B, the reflectivity becomes larger, so that the radiation intensity of the transmitted beam 44 becomes smaller than that of FIG. 7A and detection sensitivity becomes smaller.

Figure 8A:
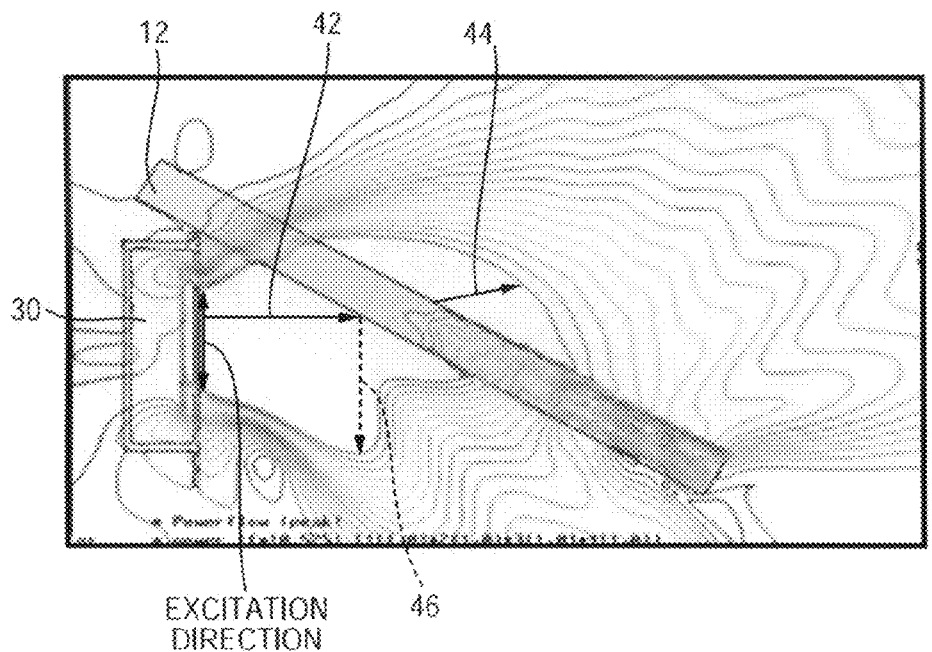
FIGS. 8A and 8B are sectional views illustrating the emission pattern in the incident surface in the simulation.
Figure 8B:
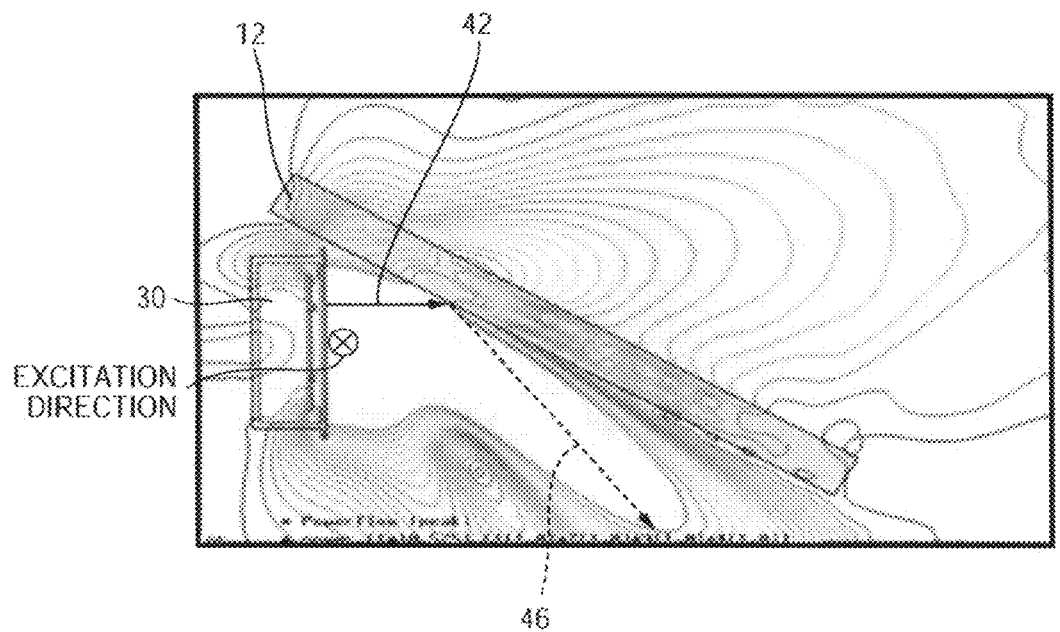
Figure 9A:
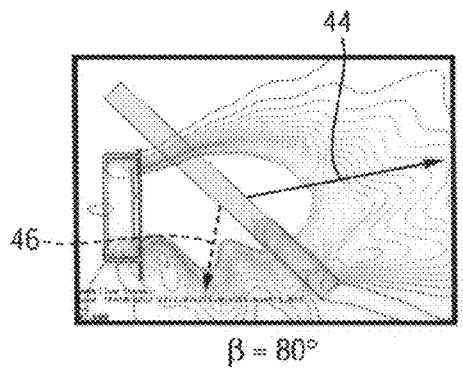
FIGS. 9A to 9F are sectional views illustrating the emission pattern in the incident surface in the simulation.
Figure 9D:
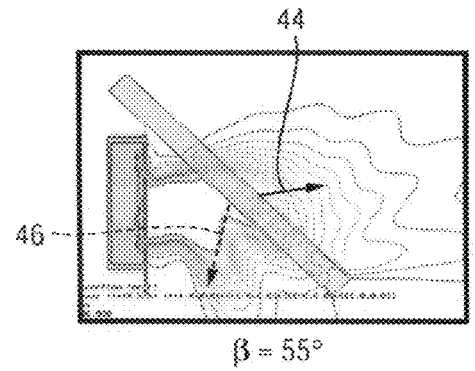
Figure 9B:
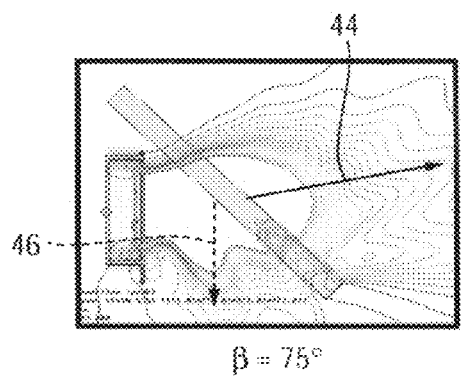
Figure 9E:
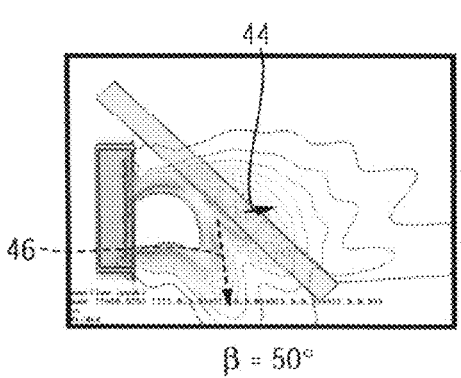
Figure 9C:
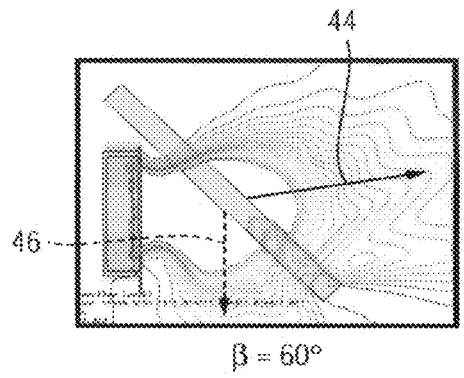
Figure 9F:
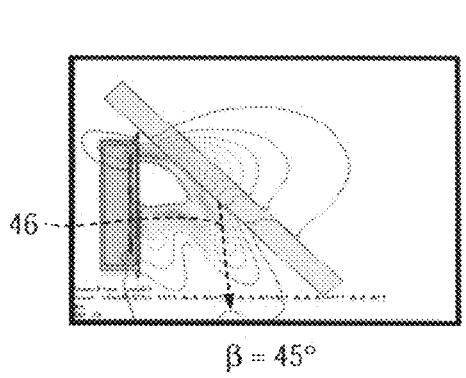

FIGS. 8A and 8B are sectional views showing the radiation pattern in the incident surface 40 in terms of a simulation in a case of the angle α=60 degree, where FIG. 8A shows a case where the excitation direction is substantially parallel to the incident surface 40 and FIG. 8B shows a case where the excitation direction is substantially perpendicular to the incident surface 40. Each transmissivity becomes smaller than that that in a case of the angle α=45 degree. Particularly, in FIG. 8B, the transmitted beam 44 hardly exists, and it is difficult to detect the object. In general, an attachment place of the high-frequency sensor 30 is determined in advance depending on the urinal. In the urinal 10, by appropriately selecting the angle α, it is possible to radiate the radio beam to the object with high precision. That is, FIGS. 9A to 9F are sectional views showing the radiation pattern in the incident surface 40 when the angle β formed between the excitation direction of the radio beam 14 and the cross line 17 is changed. At this time, FIG. 9A shows a case where the angle β=80 degree, FIG. 9B shows a case of the angle β=75 degree, FIG. 9C shows a case where the angle β=60 degree, FIG. 9D shows a case where the angle β=55 degree, FIG. 9E shows a case where the angle β=50 degree, and FIG. 9 shows a case where the angle β=45 degree, respectively, where the angle α formed between a plane including the radiation surface 32a of the antenna 32 and the upper surface 12a or the rear surface 12b of the urinal body 12 is set to 45 degree.

The transmitted beam 44 passing through the urinal body 12 becomes maximum when the angle β=90 degree, and its intensity becomes smaller as the angle β becomes smaller. Meanwhile, the reflected beam 46 (indicated by the dashed line) in the upper surface 12a or the rear surface 12b becomes larger as the angle β becomes smaller. From the analysis result, it is understood that the intensity of the reflected beam 46 is larger than that of the transmitted beam 44 when the angle β is 55 degree or more. In this embodiment, when the angle β formed between the excitation direction and the cross line 17 is set so that the intensity of the transmitted beam 44 is larger than that of the reflected beam 46, it is possible to increase the transmissivity of the radio beam 14 toward the object. With such a configuration, it is possible to facilitate the detection in the low-output radio beam.

For example, in a case of a public toilet in which a plurality of urinals are arranged in rows, it is necessary to provide the high-frequency sensor on the rear surface side of each urinal. In this case, when the radio wave radiated from the high-frequency sensor is reflected by the rear surface of the urinal made of earthenware, this reflection influences the other adjacent high-frequency sensors, and thus an erroneous detection may occur due to an interference of the radio wave.

On the contrary, according to this embodiment, when the radio wave radiation surface of the high-frequency sensor is inclined with respect to a surface of a dielectric material and the excitation direction of the radio wave is adjusted, it is possible to restrict the reflection of the radio wave at the surface of the dielectric body. As a result, it is possible to surely detect a user or the like in front of the urinal. Also, it is possible to prevent the erroneous detection caused by the reflected radio beam.

Figure 10A:
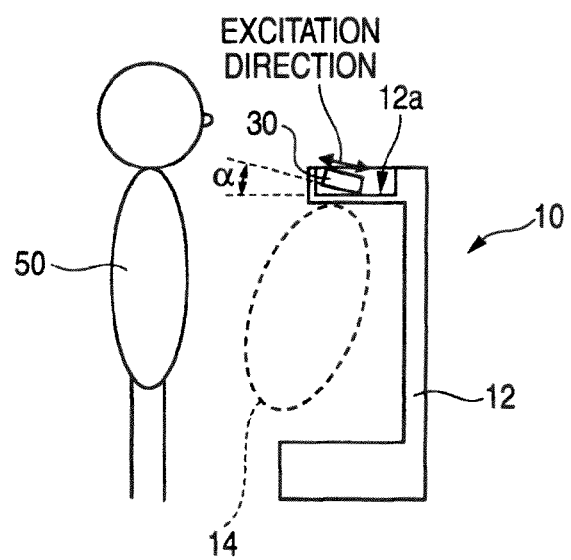
FIGS. 10A and 10B are schematic sectional views illustrating the urinal according to a first embodiment.

FIG. 10A is a schematic sectional view showing the urinal 10 according to the first embodiment. The high-frequency sensor 30 is set such that the angle β=90 degree in FIG. 1 and the excitation direction is parallel to the incident surface 40. In addition, the intersection angle α formed between the radiation surface 32a and the upper surface 12a is in a range of more than 0 degree to less than 90 degree. When a direction of the maximum radiation intensity of the radio beam 14 in the incident surface 40 is substantially perpendicular to the radiation surface 32a, a direction of the radio beam 14 generated from the high-frequency sensor 30 disposed on the upper portion of the urinal body 12 faces a human body 50.

For example, a concave portion is provided in the upper portion of the urinal body 12 made of earthenware so as to accommodate the high-frequency sensor 30, and the high-frequency sensor 30 is disposed so as to form the intersection angle α with respect to a bottom surface of the concave portion corresponding to the upper surface 12a. In this embodiment, a direction of the radio beam 14 is optimally set so as to face the human body 50, and is capable of detecting a flow of urine. Meanwhile, a disturbance such as a human body passing a space in the vicinity of the urinal or a noise of a fluorescent lamp may cause an influence.

Figure 10B:
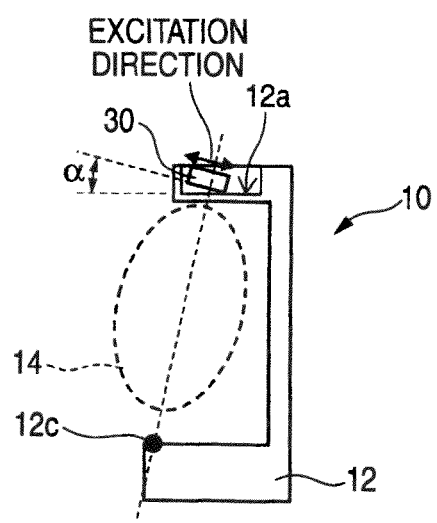

FIG. 10B is a schematic sectional view showing the urinal 10 according to a modified example of the first embodiment. A direction of the maximum radiation intensity of the radio beam 14 is substantially identical with a line connecting a center 12C of a lip front end of the urinal body 12 and the center point 36 of the antenna. With such a configuration, it is possible to detect the human body and the flow of urine with high precision. In addition, the center 12*c* is set to be located near the center of a lower portion of the urinal body 12 in a horizontal direction.

Figure 11:
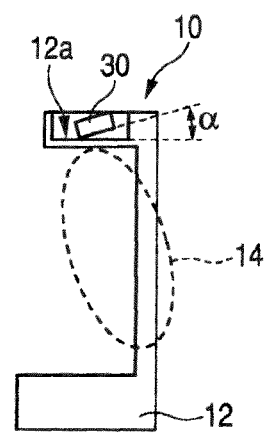
FIG. 11 is a schematic sectional view illustrating the urinal according to a second embodiment.

FIG. 11 is a schematic sectional view showing the urinal 10 according to the second embodiment. The front end portion of the radio beam 14 faces the rear surface 12*b* of the urinal body 12. Since the radio beam 14 faces the flow of urine, it is possible to optimally detect the flow of urine and to optimally restrict an influence of the disturbance. Meanwhile, since the radio beam 14 does not face the human body, sensitivity for detecting the human body may be insufficient.

Figure 12A:
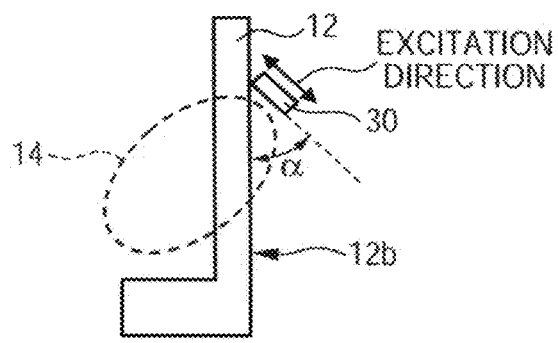
FIGS. 12A to 12C are schematic sectional views illustrating the urinal according to a third embodiment.
Figure 12B:
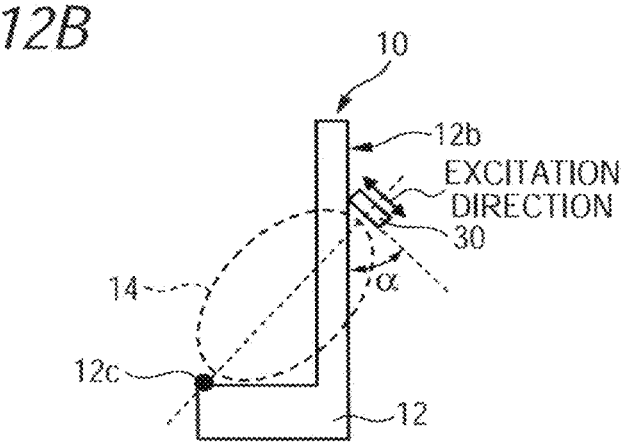

FIG. 12A is a schematic sectional view showing the urinal 10 according to the third embodiment. The high-frequency sensor 30 is disposed so as to form the intersection angle α with respect to the rear surface 12*b*. The intersection angle α is preferably in a range of more than 0 degree to less than 90 degree, and more preferably in a range of more than 0 degree to 60 degree. With such a configuration, it is optimally detect the flow of urine and to detect the human body without being influenced by the disturbance. In addition, as shown in FIG. 1, the rear surface 12*b* corresponds to a rear surface side of the urinal body 12 which is opposite to the human body. FIG. 12B is a schematic view showing a modified example of the third embodiment. A direction of the maximum radiation intensity of the radio beam 14 is substantially identical with a line connecting a center 12C of a lip front end of the urinal body 12 and the center point 36 of the antenna, thereby detecting the flow of urine and the human body with high precision.

Figure 12C:
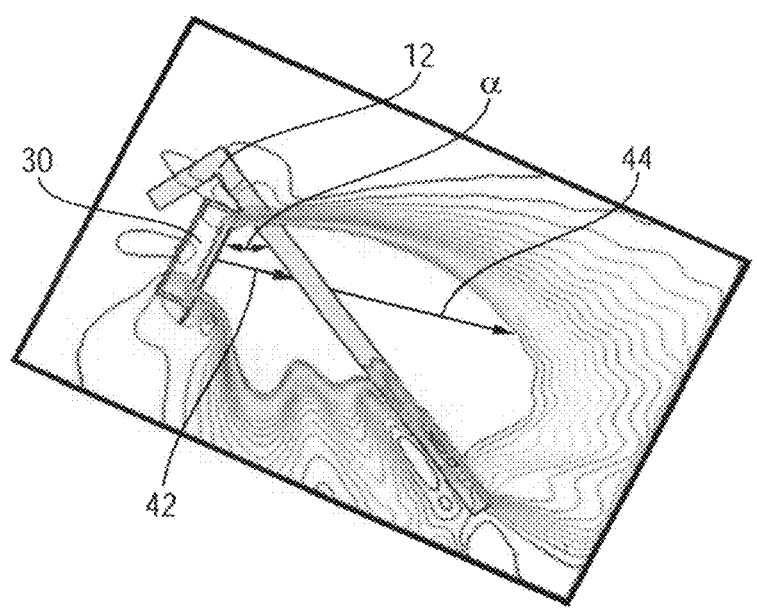

FIG. 12C is a sectional view showing the radiation pattern according to the modified example of the third embodiment, where a maximum intensity direction of the radiation pattern is substantially perpendicular to the radiation surface 32*a* in a case where the angle α=60 degree.

Figure 13A:
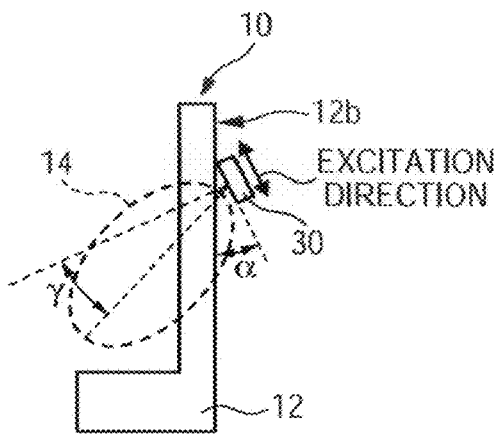
FIGS. 13A and 13B are schematic sectional views illustrating the urinal according to a fourth embodiment.
Figure 13B:
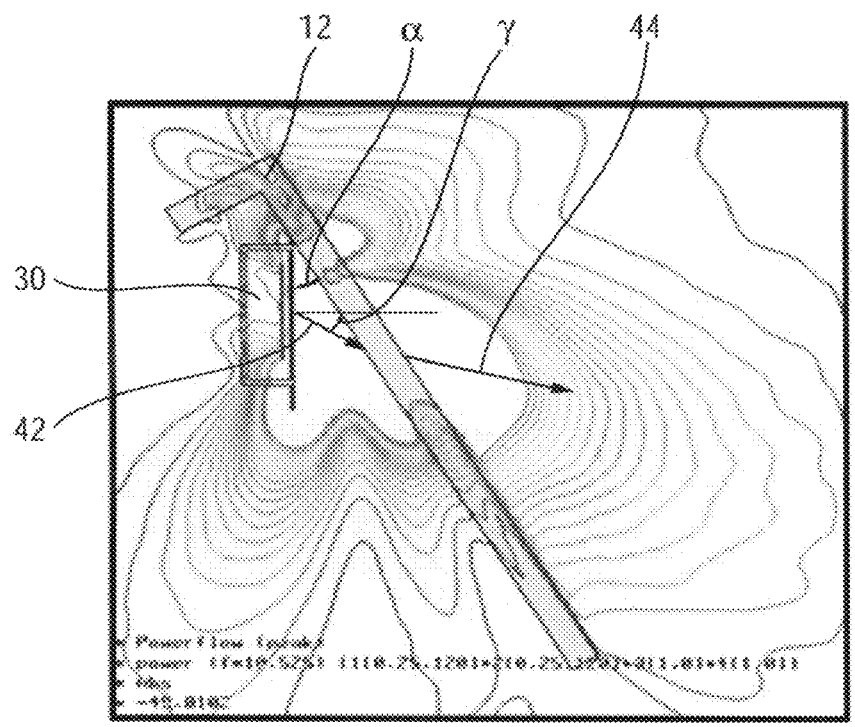

FIG. 13A is a schematic view showing the urinal 10 according to the fourth embodiment in a case where the maximum intensity direction is inclined with respect to a normal line of the radiation surface 32*a* and the angle α>0 degree. In addition, FIG. 13B is a sectional view showing the radiation pattern in a case where the angle α=30 degree and an intersection angle γ formed between the normal line of the radiation surface 32*a* and the maximum intensity direction is 30 degree. In this embodiment, the angle α is smaller than that of the third embodiment. Therefore, the urinal can be reduced in thickness by reducing a space of the rear surface 12*b*. However, when the intersection angle γ is larger than 30 degree, a gain of the antenna decreases and a radiation power decreases. As a result, it is difficult to maintain high precision upon detecting the flow of urine and the human body. For this reason, the intersection angle γ is preferably in a range of 0 to 30 degree.

Figure 14:
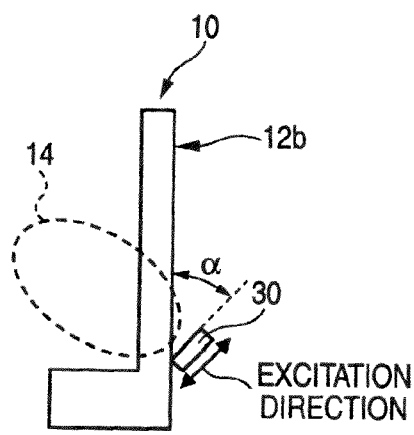
FIG. 14 is a schematic sectional view illustrating the urinal according to a fifth embodiment.

FIG. 14 is a schematic sectional view showing the urinal 10 according to a fifth embodiment. The high-frequency sensor 30 is located at a position in the vicinity of a height of the center 12C and is inclined at the intersection angle α with respect to the rear surface 12*b* so that the radio beam 14 is radiated upward. When the intersection angle α is large, it is possible to increase the transmissivity of the radio beam 14. Particularly, it is possible to improve precision upon detecting the flow of urine.

In the first to fifth embodiments, the angle α formed between the radiation surface 32*a* and the upper surface 12*a* of the urinal body 12 or the angle α formed between the radiation surface 32*a* and the rear surface 12*b* is set in a range of more than 0 degree to less than 90 degree. In addition, the intersection angle β formed between the excitation direction and the cross line 17 is set so that the intensity of the radio beam 14 passing through the urinal body 12 is larger than that of the reflected beam 46 reflected by the upper surface 12*a* or the rear surface 12*b*. With such a configuration, it is possible to easily allow the transmitting beam 44 to correctly face the object, and thus to increase the transmissivity of the radio beam 14. Also, it is possible to restrict an influence of the disturbance using the low-output radio beam 14, and thus to provide the urinal 10 capable of detecting the object with high precision.

As described above, the exemplary embodiments of the invention have been described with reference to the accompanying drawings. However, the present invention is not limited to the exemplary embodiments, but the shape, the size, the material, and the arrangement relationship of the urinal body, the antenna, and the high-frequency sensor constituting the urinal may be modified by the person skilled in the art without departing from the spirit of the present invention.

What is claimed is:

1. A urinal comprising:
a urinal body;
a high-frequency sensor which radiates a radio beam obliquely passing through an upper surface of the urinal body toward a bowl and receives a reflected wave from an object so as to generate a detection signal; and
a valve which discharges or stops flushing water to the urinal body in response to the detection signal,
wherein an angle formed between a first plane including the upper surface of the urinal body and a second plane including a radiation surface of an antenna of the high-frequency sensor is in a range of more than 0 degree to less than 90 degree,
wherein a cross line where the first plane and the second plane intersect with each other is substantially parallel to a horizontal direction of the urinal body,
wherein the radio beam is a linearly-polarized wave,
wherein an excitation direction of the radio beam intersects with the cross line, and
wherein an intersect angle between the excitation direction and the cross line is set such that an intensity of the radio beam passing through the upper surface of the urinal body is larger than that of the radio beam reflected by the upper surface.

2. The urinal according to claim 1, wherein the excitation direction is substantially perpendicular to the cross line.

3. The urinal according to claim 1, wherein a direction of the maximum intensity of the radio beam is substantially identical with a line connecting a center point of the antenna and a center of a lip front end of the urinal body.

4. The urinal according to claim 2, wherein a direction of the maximum intensity of the radio beam is substantially identical with a line connecting a center point of the antenna and a center of a lip front end of the urinal body.

5. A urinal comprising:
a urinal body;
a high-frequency sensor which radiates a radio beam obliquely passing through a rear surface of the urinal body toward a bowl and receives a reflected wave from an object so as to generate a detection signal; and
a valve which discharges or stops flushing water to the urinal body in response to the detection signal,
wherein an angle formed between a first plane including the rear surface of the urinal body and a second plane including a radiation surface of an antenna of the high-frequency sensor is in a range of more than 0 degree to less than 90 degree,
wherein a cross line where the first plane and the second plane intersect with each other is substantially parallel to a horizontal direction of the urinal body, wherein the radio beam is a linearly-polarized wave,
wherein an excitation direction of the radio beam intersects with the cross line, and
wherein an intersect angle between the excitation direction and the cross line is set such that an intensity of the radio beam passing through the rear surface of the urinal body is larger than that of the radio beam reflected by the rear surface.

6. The urinal according to claim 5, wherein the excitation direction is substantially perpendicular to the cross line.

7. The urinal according to claim 5, wherein a direction of the maximum intensity of the radio beam is substantially identical with a line connecting a center point of the antenna and a center of a lip front end of the urinal body.

8. The urinal according to claim 6, wherein a direction of the maximum intensity of the radio beam is substantially identical with a line connecting a center point of the antenna and a center of a lip front end of the urinal body.

* * * * *